United States Patent
Nakayama et al.

[11] Patent Number: 6,023,651
[45] Date of Patent: Feb. 8, 2000

[54] INTERNAL COMBUSTION ENGINE MISFIRE DETECTION WITH ENGINE ACCELERATION AND DECELERATION CORRECTION DURING A REPETITIVE MISFIRE CONDITION

[75] Inventors: Masaaki Nakayama, Toyoake; Yasuo Mukai, Kariya, both of Japan

[73] Assignee: Denso Corporation, Kariya, Japan

[21] Appl. No.: 08/953,372

[22] Filed: Oct. 17, 1997

[30] Foreign Application Priority Data

Oct. 17, 1996 [JP] Japan .................................. 8-274764

[51] Int. Cl.[7] .................................................. G01M 15/00
[52] U.S. Cl. ............................ 701/110; 73/116; 73/117.3; 123/436
[58] Field of Search .................................... 701/110, 111; 123/419, 436; 73/116, 117.2, 117.3, 118.1

[56] References Cited

U.S. PATENT DOCUMENTS

| | | | |
|---|---|---|---|
| 5,245,866 | 9/1993 | Hashiguchi et al. | 73/117.3 |
| 5,275,037 | 1/1994 | Nakayama et al. | 73/117.3 |
| 5,497,328 | 3/1996 | Sugai et al. | 701/110 |
| 5,499,537 | 3/1996 | Nakayama et al. | 73/117.3 |
| 5,670,713 | 9/1997 | Machida et al. | 73/116 |
| 5,689,065 | 11/1997 | Kuroda et al. | 73/117.3 |

FOREIGN PATENT DOCUMENTS 4-301161  10/1992  Japan .
4-365958  12/1992  Japan .

*Primary Examiner*—George Dombroske
*Attorney, Agent, or Firm*—Nixon & Vanderhye P.C.

[57] ABSTRACT

To accurately detect patterns of misfires in an internal combustion engine, misfire is detected by calculating angular speed variation responsive to crankshaft rotation and comparing that with a predetermined misfire reference value. The calculated angular speed variation includes a first elementary term showing rotational variation of two different cylinders and a second correction term showing the rotational variation of the same cylinder separated by one combustion cycle. The elementary term shows how much rotational variation is between the cylinder n and the previous cylinder n–1 due to the occurrence of misfire. In contrast, the correction term shows how much error in the rotational variation is caused in same cylinder (e.g., mainly when accelerating or decelerating).

12 Claims, 4 Drawing Sheets

INTERNAL COMBUSTION ENGINE MISFIRE DETECTION WITH ENGINE ACCELERATION AND DECELERATION CORRECTION DURING A REPETITIVE MISFIRE CONDITION

CROSS-REFERENCE TO RELATED APPLICATION

This application is related to Japanese Patent Application No. Hei 8-274764, incorporated herein by reference.

BACKGROUND OF THE INVENTION

1. Field of the Invention

The present invention relates to an apparatus for detecting the occurrence of misfire in an internal combustion engine using rotational speed variation of an engine output shaft.

2. Description of Related Art

Conventionally, as such kinds of an apparatus for detecting the occurrence of misfire in an internal combustion engine, JP-A 4-365958 (U.S. Pat. No. 5,275,037), for example, discloses an apparatus for detecting the occurrence of misfire based on variation of rotational speed (a crank angular speed) between two cylinders which successively make expansion strokes. Generally, in an internal combustion engine, when a misfire occurs during an expansion stroke in one cylinder, the rotational speed at this time, that is, the rotational angular speed of the crankshaft, which is an engine output shaft, decreases. For this reason, the occurrence of misfire in each cylinder can be detected by watching changes in rotational speed.

Particularly, in such an apparatus of the above-mentioned JP-A 1-365958 (U.S. Pat. No. 5,275,037), for a 4-stroke type multi-cylinder internal combustion engine, the apparatus calculates a first variation amount based on the variation of the rotational speeds of two cylinders which successively make expansion strokes and also calculates a second variation amount in the same way based on the variation of rotational speeds of two cylinders which are separated by 360° CA (crank angle) before the cylinders used for calculating the first variation. Accordingly, an occurrence of misfire in the engine is detected on the basis of the difference between the first and second variations. Therefore, to obtain the difference of rotational speed variation for cylinders which are separated by 360° CA means to watch the rotational speed variation of facing cylinders (cylinders which are separated by one rotation of the crankshaft in the expansion stroke) in an internal combustion engine having an even number of cylinders. In such a case, the rotational speed variation, which is substantially consistent in a period of the rotational variation (dispersion degree), can be used as a parameter, thereby being regarded as an object which can cut down on errors in the misfire detection.

In contrast, as a technique of detecting misfire by using the above-mentioned difference between rotational speed variations, the prior art has proposed an apparatus which calculates rotational speed variation for cylinders separated by 720° CA, that is, the same cylinder, and detects misfire on the basis of the calculation result. This technique has almost completely canceled detection errors caused by the dispersion of rotational speeds between cylinders.

However, according to the above-mentioned related art, problems remain. For example, the conventional misfire detecting apparatus may not be able to detect an occurrence of misfire caused by a specific pattern. More specifically, in case of calculating the difference in rotational speed variation for facing cylinders (cylinders separated by 360° CA), occurrence of misfire cannot be detected because, when both facing cylinders are misfiring, rotational variations due to misfires are counterbalanced. In addition, in case of calculating the difference of rotational speed variation for of the same cylinder (cylinders separated by 720° CA), an occurrence of misfire also cannot be detected because when the same specific cylinder is continuously misfiring, rotational variation due to the misfires are counterbalanced.

SUMMARY OF THE INVENTION

In light of the foregoing problem, it is an object of the present invention to provide an apparatus for detecting misfire in an internal combustion engine which can accurately detect any patterns of misfire occurring in the engine.

to attain the foregoing object, the present invention calculates variation of the rotational speed per cylinder as a rotational variation elementary term for two different cylinders which are "m" times away from each other in expansion strokes and also calculates a rotational variation correction term by dividing the variation of rotational speed per cylinder by "the number of whole cylinders * s/m", for the same cylinder which is "s" times away in combustion cycles. The rotational variation elementary term is then corrected by the rotational variation correction term to detect an occurrence of misfire in the internal combustion engine on the basis of the corrected value.

Here, the variation amount of the rotational speed need not necessarily be used. The amount may be a rotational angular deviation, for example, which corresponds to the variation amount. In addition, a value corresponding to the rotational angular deviation or deviation of times for rotation may be used as a value corresponding to the rotational variation amount. Further, the combustion cycle includes an intake stroke, a compression stroke, an expansion stroke and an exhaust stroke. In a 4-stroke cycle type internal combustion engine, 720° CA corresponds to one combustion cycle, while 360° CA corresponds to one combustion cycle for a 2-stroke cycle type internal combustion engine.

Other objects and features of the present invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS (First Embodiment)

Figure 1:
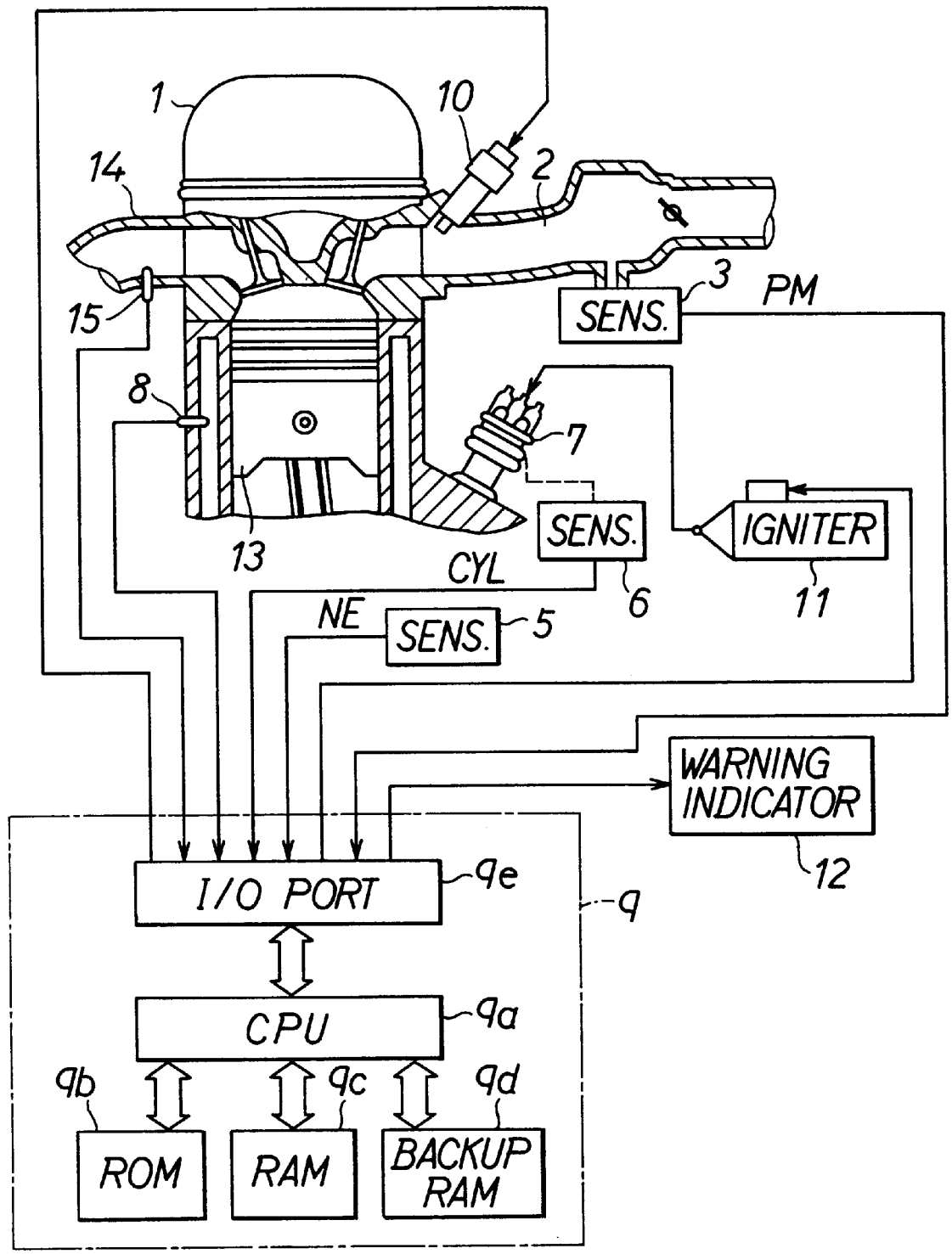
FIG. 1 shows a misfire detecting apparatus according to a first embodiment of the present invention.

FIG. 1 shows an apparatus for detecting misfire in an internal combustion engine according to a first embodiment of the present invention.

The first embodiment is intended for a V-8 four-stroke type internal combustion engine. That is, according to the first embodiment as shown in FIG. 1, an internal combustion engine 1 has eight cylinders. Here, the firing order is assumed to be #1→#2→#3→#4→#5→#6→#7→#8 for convenience.

The internal combustion engine 1 is connected to an intake pipe 2 for leading intake air introduced from an air cleaner (not shown) into the engine 1 via the intake pipe 2. In the intake pipe 2, an intake pipe pressure sensor 3 is provided for sensing a pressure PM within the intake pipe 2. The detected pressure PM within the intake pipe 2 is input as one parameter indicative of the operating condition of the internal combustion engine 1 to an electronic control unit (hereinafter, ECU) 9 which will be described later.

Further, in relation to the crankshaft (not shown) of the engine 1, an electromagnetic pickup-type rotational angle sensor 5 generates a rotational signal NE at every predetermined increment of crank angle. The rotational speed of the engine 1 or the like is obtained based on the rotational speed signal generated by the rotational angle sensor 5. This rotational signal NE is also input as one parameter indicating an operating condition of the engine 1 to the later-described ECU 9.

Further, a distributor 7 controls firing timing, firing order and the like corresponding to each of the cylinders, and within the distributor 7, a reference position sensor 6 outputs a signal CYL indicative of one cylinder, for example, outputting the signal CYL to the ECU 9 whenever a piston 13 of the first cylinder reaches the uppermost position (top dead center: #1TDC). Here, the distributor 7 itself gets rotary power and rotates at a half rotation speed of the rotary power.

In addition, in a cooling water passage of the engine 1, a water temperature sensor 8 is provided for sensing the temperature of the cooling water which circulates through the passage. A discharge pipe 14 is provided with an oxygen ($O_2$) sensor 15 for detecting a rich/lean condition of an air fuel ratio based on oxygen concentration of combustion gas. The cool water temperature detected by the temperature sensor 8 and a detected signal indicating the richness/leanness of the air fuel ratio detected by the oxygen sensor 15 are input as parameters illustrating operating conditions of the internal combustion engine 1.

The ECU (electronic control unit) 9 to which each detected signal is input by the water temperature sensor 8, the oxygen sensor 15, the intake pipe pressure sensor 3, rotation angle sensor 5 and the reference position sensor 6, includes, as illustrated in FIG. 1, a CPU (central processing unit) 9a, a read-only ROM 9b for storing control programs and control constants necessary for calculation, a RAM 9c as a data memory for temporarily storing calculation data, a back-up RAM 9d for backing up the data memory through a battery (not shown), and an input/output (I/O) port 9e for inputting control signals to and outputting signals from an external device.

Generally speaking, the ECU 9 executes the following processing (A) and (B):

(A) calculating appropriate control amounts of the ignition system and the fuel system based on the detection signals from the above-mentioned sensors to output control signals for controlling an injector 10, an igniter 11 and other components.

(B) detecting an occurrence of misfire in each cylinder in the internal combustion engine 1 based on the detection signals from the same sensors.

In the ECU 9, in relation with driving the injection 10 in the above-mentioned operation (A), the driving is executed with well-known air fuel ratio feedback control on the basis of the output of the oxygen sensor 15. In addition, according to the detection of the occurrence of misfire as mentioned in operation (B), when the occurrence of misfire is determined, a warning lamp 12 is lit to warn drivers of the occurrence of misfire and to execute fail-safe processing, for example.

Next, operations of the apparatus for detecting misfire will be described. First, however, a discussion of the basis for misfire detection using the cylinder rotational speeds will be helpful. To begin, the rotational variation elementary term of cylinder n can be formulated as follows when the rotational speed per cylinder is "$\omega$".

$$\omega_{n-m} - \omega_n$$

while the rotational variation correction term can be formulated as $$\frac{\omega_{n-m-N*s} - \omega_{n-m}}{\left(\frac{N*s}{m}\right)}$$

where N stands for the number of whole cylinders, and $\omega_{n-m-N*s} - \omega_{n-m}$ is a rotational variation amount for one same cylinder.

Therefore, the last rotational speed variation amount $\Delta\omega$ for detecting an occurrence of misfire can be formulated in the following Equation (1):

$$\Delta\omega = (\omega_{n-m} - \omega_n) - \frac{\omega_{n-m-N*s} - \omega_{n-m}}{\left(\frac{N*s}{m}\right)} \quad (1)$$

Here, for easy understanding, if the rotational variation elementary term is calculated from variations of two cylinders which successively make the expansion strokes and the rotational variation correction term is calculated from variations for one cylinder which are one combustion cycle apart (that is, m=1 and s=1), Equation (1) should be as follows:

$$\Delta\omega = (\omega_{n-1} - \omega_n) - \{(\omega_{n-9} - \omega_{n-1})/N\} \quad (2)$$

In such a case, the rotational variation elementary term $(\omega_{n-12} - \omega_n)$ of Equation (2) indicates how the cylinder n has rotational variation in regard to the previous cylinder (cylinder n-1) due to the occurrence of misfire, while the rotational variation correction term $\{(\omega_{n-1-N} - \omega_{n-1})/N\}$ indicates an error (difference) of the rotational variation occurring when accelerating or decelerating.

Here, if the engine is accelerating or decelerating and the engine rotational speed is increasing or decreasing in substantially fixed intervals, even if no misfire occurs, the elementary term includes a rotational variation element between cylinders due to the acceleration or deceleration, thereby resulting in a chance of misdetecting an occurrence of misfire. According to Equation (2), however, the rotational variation element between cylinders due to the acceleration/deceleration is canceled by the correction term ($\Delta\omega=0$). Therefore, misdetection of misfire can be prevented.

Under such conditions, when a misfire actually occurs, a variation amount comprising the rotational variation element due to misfire and the rotational variation element due to the acceleration/deceleration is obtained by the rotational variation elementary term ($\omega_{n-1}-\omega_n$) and only the rotational variation due to the misfire is extracted as the $\Delta\omega$ value by taking the rotational variation correction term $\{(\omega_{n-1-N}-\omega_{n-1})/N\}$ from the elementary term. Accordingly, occurrence of misfire is accurately detected by determining that the $\Delta\omega$ value is over the misfire reference value.

In addition, if the internal combustion engine is in normal operation (fixed speed traveling), as $\omega_{n-1-N}$ is nearly equal to $\omega_{n-1}$, the rotation variation correction term becomes substantially "0", thereby detecting the occurrence of misfire based on the rotational variation elementary term ($\omega_{n-1}-\omega_n$). (If $\omega_{n-1}-\omega_n$ is greater than the misfire reference value, the occurrence of misfire can be detected.)

On the contrary, when continuous misfires occur in specific cylinders, such as continuous misfires of facing cylinders, continuous misfires of the same cylinder, or the like, the rotational variation correction term $\{(\omega_{n-1-N}-\omega_{n-1})/N\}$ of the misfired cylinder only corresponds to the variation of the engine rotational speed. That is, the correction term corresponds to the rotational variation element along with change in the engine rotational speed when vehicle acceleration or deceleration (0 during driving in a fixed speed). For this reason, the rotational variation element due to the misfire is included in the rotational variation elementary term ($\omega_{n-1}-\omega_n$) and is consistent with a value $\Delta\omega$ of subtracting the rotational variation correction term $\{(\omega_{n-1-N}-\omega_{n-1})/N\}$ from the elementary term ($\omega_{n-1}-\omega_n$). Therefore, Equation (2) can calculate the value as data corresponding to the occurrence of misfire per cylinder. That is, by subtracting the correction term from the elementary term, the rotational variation element followed by the vehicle speed change is removed, thereby extracting only the rotational variation element due to misfire. Therefore, on the occurrence of continuous misfires of the specific cylinder (s), the misfire can accurately detected.

Accordingly, the present invention can solve the conventional problems where continuous misfires of specific cylinder(s) can hardly be detected, and the present invention can detect accurately any patterns of misfire occurring in the internal combustion engine.

On calculating the rotational variation elementary term, a preferred aspect of the present invention provides calculation of variation amount of the rotational speed per cylinder in regard to two cylinders which successively make expansion strokes. That is, m=1 in Equation (1). In this case, the rotational variation element between cylinders due to misfire can be accurately detected without receiving any influence of the rotational variation (rotational pulsation) during a minute period, thereby further improving the reliability of the misfire detection results.

On calculating the rotational variation correction term, another aspect of the present invention provides calculation of the correction term by dividing the variation amount of the rotational speeds per cylinder in regard to the cylinder whose speeds are one combustion cycle away by "the number of whole cylinders/m". Accordingly, s=1 in the equation (1). Here, only a minimum number of data are necessary when calculating the value of $\Delta\omega$, thereby reducing memory capacity.

Figure 2:
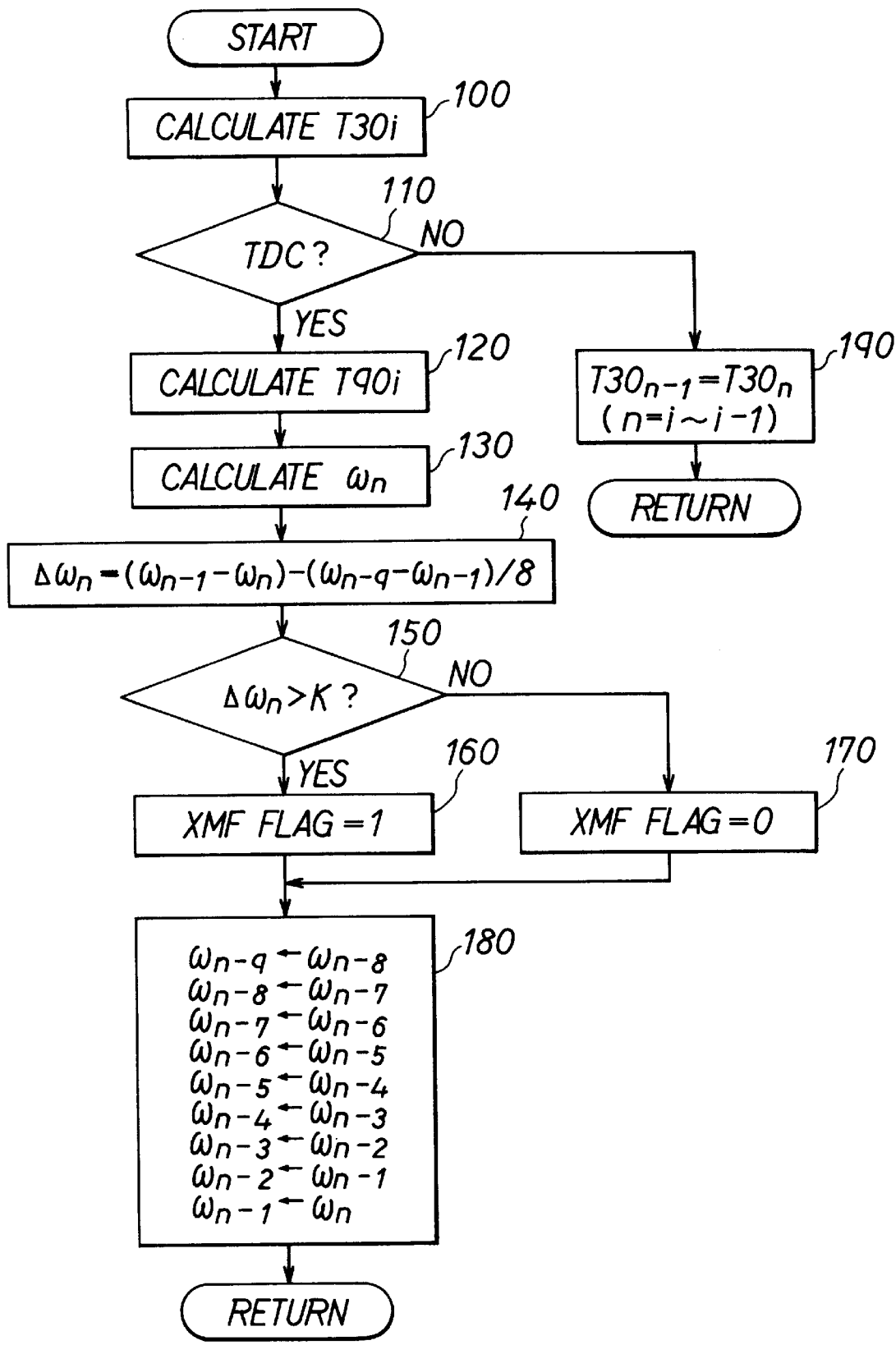
FIG. 2 is a flowchart for describing a misfire detecting routine according to the first embodiment.
Figure 3A:
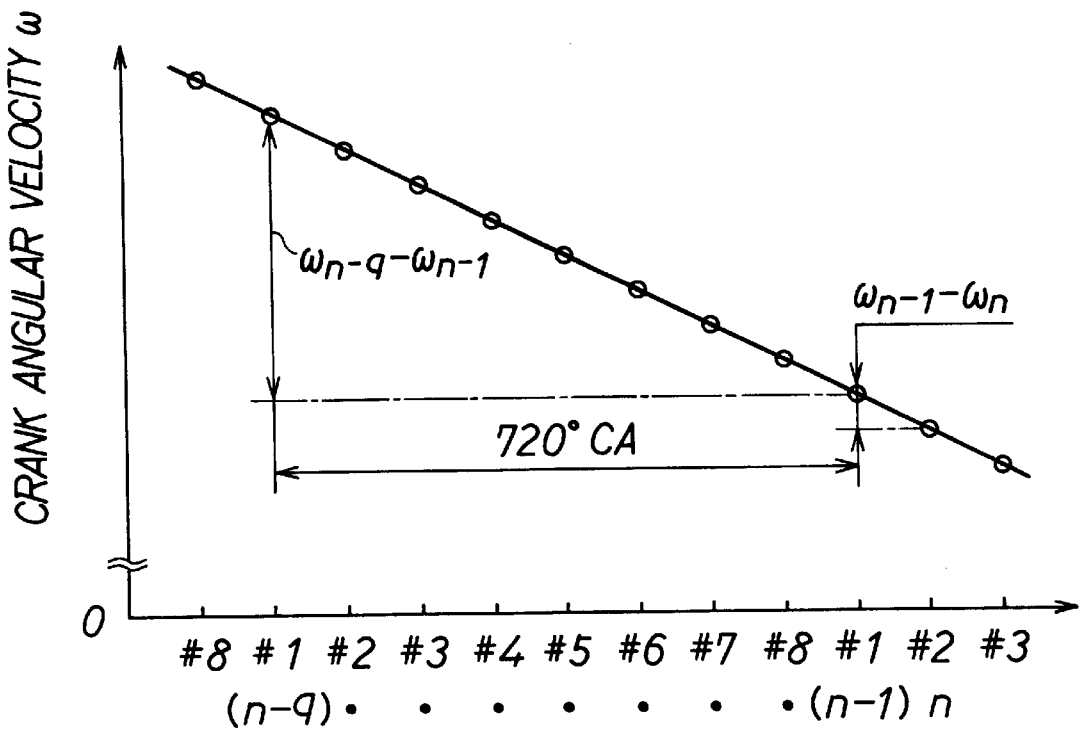
FIGS. 3A and 3B are graphs of variations of a crank angular speed when a misfire occurs in one single cylinder in the embodiment.

A flowchart in FIG. 2 shows a misfire detecting routine which is a main routine of the exemplary embodiment. The same routine is executed by the CPU 9a in the ECU 9. FIGS. 3 and 4 are characteristic diagrams illustrating variation of the crank angle speed, for explaining a misfire condition. A description will be made below with reference to FIGS. 2–4 in terms of a misfire detecting operation of the apparatus according to the present embodiment.

First, a misfire detecting routine is described with reference to FIG. 2.

This misfire detecting routine is executed as an angle interruption routine at every 30° CA (crank angle) of the internal combustion engine 1 on the basis of the rotational signal NE. That is, when the crankshaft makes a revolution of 30° CA and the interruption routine condition is realized, the CPU 9a starts the operation with a step 100 to calculate a time T30i taken for the revolution of 30° CA on the basis of the deviation between the previous interruption time and the present interruption time.

The operation then advances to a step 110 to check whether the present interruption timing corresponds to top dead center (TDC) on the basis of the reference position signal CYL. If the present interruption timing does not correspond to TDC, the CPU 9a advances to a step 190 to replace the previous value with the time T30i. Namely, T30i is changed to T30i-1 and T30i-1 is changed to T30i-2 (the i affixed to the time indicates a number of processings by the CPU 9a). After the step 190, the CPU 9a terminates this routine as it is.

On the other hand, if the present interruption timing corresponds to TDC, the operation proceeds to a step 120 to calculate the time T90i necessary for revolution of 90° CA on the basis of the time T30i calculated in the step 100 and T30i-1, T30i-2, T30i-3 obtained by the previous three operations executed immediately before the present operation.

further, a subsequent step 130 is for calculating angular speed (crank angular speed) $\omega_n$ (n=1–8) per cylinder. More specifically, in case of targeting the 8-cylinder internal combustion engine as in the present embodiment, the crank angular speed $\omega n$ is calculated on the basis of the calculated time T90i in accordance with the following Equation (3):

$$\omega n = \frac{KDSOMG}{T90i} \qquad (3)$$

where KDSOMG is a conversion factor for obtaining rotational angular speed (rad: radian) of the crankshaft.

Incidentally, in case of targeting a 6-cylinder internal combustion engine, a time T120i necessary for crankshaft revolution of 120° CA is used for calculating the same crank angular speed $\omega n$ while a time T180i necessary for crankshaft revolution of 180° CA is used in case of a 4-cylinder internal combustion engine.

Next, the CPU 9a proceeds to a step 140 to calculate an angular speed variation between the cylinders for the cylinder of number n-1 on the basis of the calculated crank angular speed on in accordance with the following Equation (4):

$$\Delta\omega = (\omega_{n-1} - \omega_n) - \frac{\omega_{n-9} - \omega_{n-1}}{8} \qquad (4)$$

where $\omega n$ is the present crank angular speed, and $\omega_{n-1}$ represents the previous crank angular speed. In addition, $\omega_{n-9}$ denotes a crank angular speed before 720° CA for the same cylinder as the crank angular speed $\omega_{n-1}$ [the affix n-9 means (n-1)-8].

Here, ($\omega_{n-1}-\omega_n$), the first term of the right side of Equation (4), corresponds to an elementary term showing rotational variation of two different cylinders, while $\{(\omega_{n-9}-\omega_{n-1})/8\}$, the second term of the right side of Equation (4), corresponds to a correction term showing the rotational variation of the same cylinder by (with a difference of) one combustion cycle. Here, the elementary term ($\omega_{n-1}-\omega_n$)

shows how much the rotational variation is between the cylinder n and the previous cylinder n−1 due to the occurrence of misfire. In contrast, the correction term $\{(\omega_{n-9}-\omega_{n-1})/8\}$ shows how much the rotational variation is in the same cylinder mainly by acceleration or deceleration, and also can be an error of the rotational variation element for the misfire detection.

In a step 150, CPU 9a compares the angular speed variation amount with a predetermined misfire reference value K for decision of the occurrence of misfire. If the angular speed variation amount Δω is greater than the reference value K, the occurrence of a misfire is decided and hence the operational flow goes to a step 160 to set a misfire detection flag XMF to "1".

On the other hand, if, in the step 150, Δω is not greater than K, no occurrence of a misfire is decided and the operational flow goes to a step 170 to reset the misfire detection flag XMF to "0". At this point, the misfire detection flag XMF may be provided with each cylinder to identify which cylinder has misfired.

When the misfire detection flag XMF is set to "1", the alarm lamp 12 or the like is turned on to inform the driver or the operator that a discrepancy such as emission deterioration, catalytic converter damage or the like has occurred.

After the operation of the misfire detection flag XMF, the CPU 9a advances the operation to a step 180 to shift the crank angular speed data stored in the RAM 9c $\omega_{n-9}, \omega_{n-8}, \omega_{n-7}, \omega_{n-6}, \omega_{n-5}, \omega_{n-4}, \omega_{n-3}, \omega_{n-2}, \omega_{n-1}, \omega_n$ to annulment, $\omega_{n-9}, \omega_{n-8}, \omega_{n-7}, \omega_{n-6}, \omega_{n-5}, \omega_{n-4}, \omega_{n-3}, \omega_{n-2}, \omega n_{-2}$, respectively, and stores them in the RAM 9c; thereafter the routine is terminated.

In this connection, according to the present embodiment, the routine of step 130 in FIG. 2 corresponds to rotation speed calculating means in the claims, while the operations of the steps 140 and 150 correspond to rotational variation elementary term calculating means and misfire detecting means, respectively.

Next, a series of misfire detecting operation routine steps will be described more specifically with reference to FIGS. 3A, 3B and 4. These Figures are for illustrating variation of the crank angular speed ω at each of cylinders Nos. 1 through 8 at the time of vehicle deceleration, FIGS. 3A and 3B indicating the variation of the crank angular speed when a misfire occurs in a specific cylinder. Here, in FIGS. 3A, 3B and 4, rotational dispersion due to differences among individual cylinder is considered to be very little; therefore, the dispersion is disregarded.

Figure 3B:
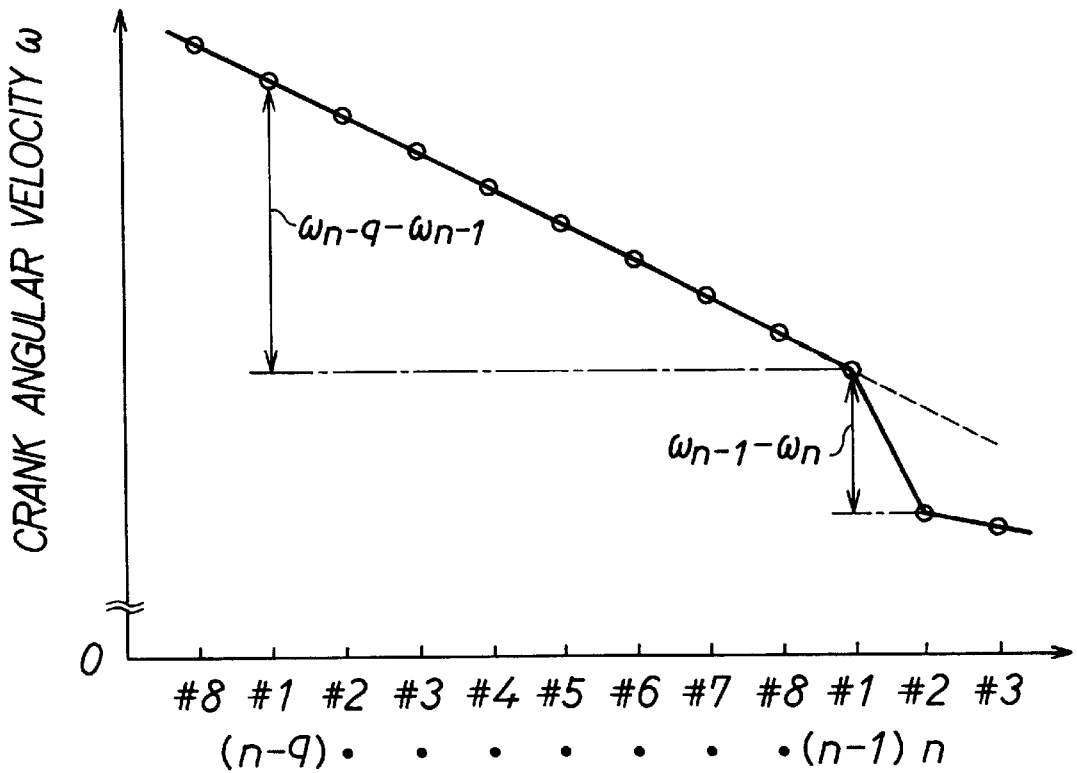
Figure 4:
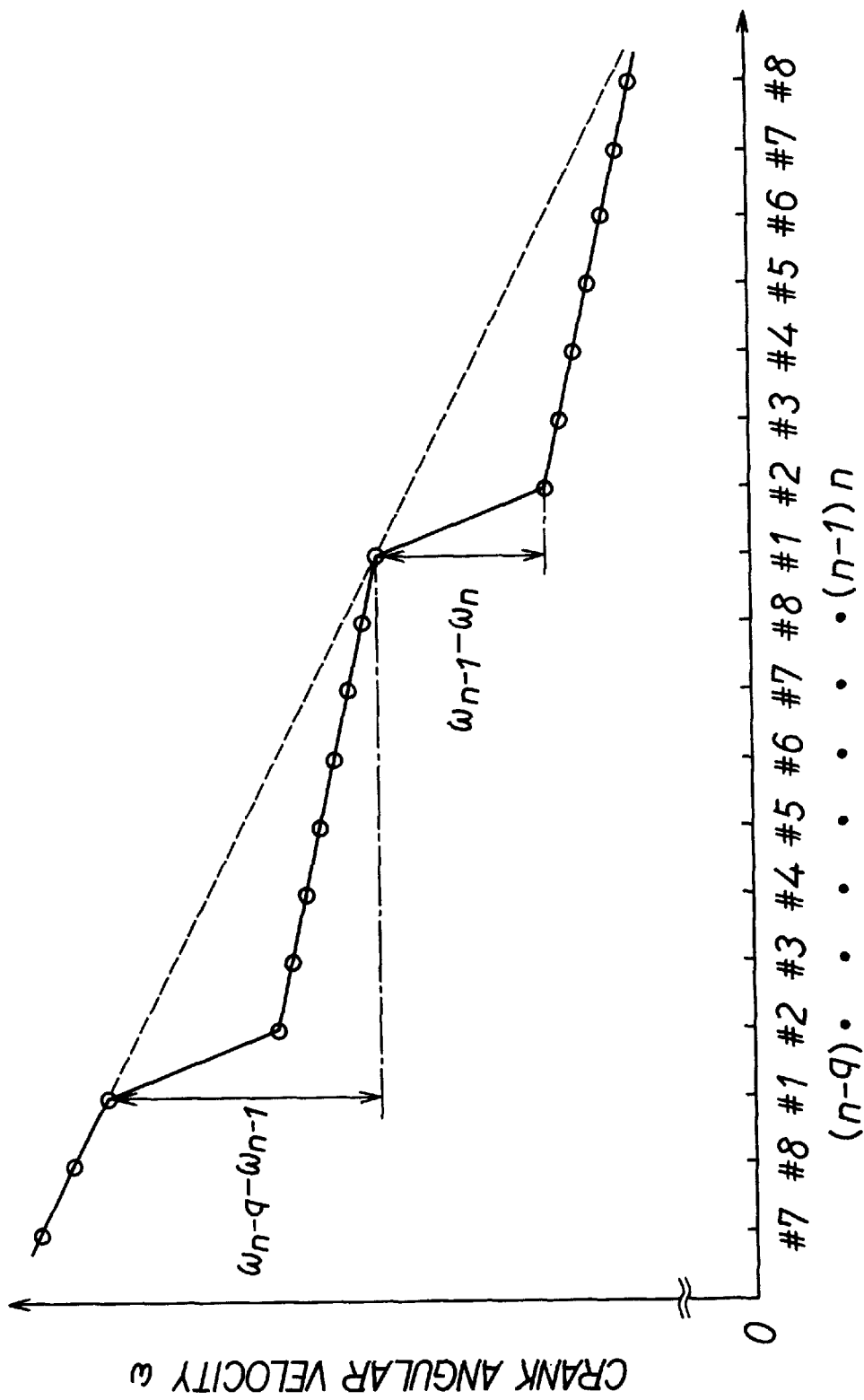
FIG. 4 is a graph of variation of crank angular speed when continuous misfires occur in a specific cylinder in the embodiment.

In addition, both FIGS. 3B and 4 show that the misfire occurs in cylinder 2 (#2). If the cylinder 2 (#2) is to be cylinder No. n, cylinder 1 (#1) becomes a cylinder No. n−1, and the same cylinder 1 before 720° CA of the cylinder 1 (#1) becomes cylinder No. n−9.

Especially, by using the following Equation (5), $$\Delta\omega = (\omega_{n-1} - \omega_n) - \{(\omega_{n-9} - \omega_{n-1})/8\} \tag{5}$$

these FIGS. 3A, 3B and 4 are for proving that the occurrence of misfire can be accurately detected no matter what pattern of the misfire is. Below, the description of FIGS. 3A, 3B and 4 explains a misfire detecting operation routine with reference to the above Equation (5).

In FIG. 3A, if the crank angular speed decreases substantially in a fixed difference, even if the misfire does not occur, a rotational variation element between cylinders due to the deceleration is included in the elementary term $(\omega_{n-1}-\omega_n)$ of Equation (5) (so that $\omega_{n-1}-\omega_n$ becomes greater than K), thereby resulting in the possibility of erroneous decision of the occurrence of misfire. However, by using the above-mentioned Equation (4), the rotational variation element between cylinders due to the deceleration is canceled by the correction term $\{(\omega_{n-9}-\omega_{n-1})/8\}$ in the Equation (4). That is, in FIG. 3A, the following Equation (6) can be followed.

$$\omega_{n-1} - \omega_n = \frac{\omega_{n-9} - \omega_{n-1}}{8} \tag{6}$$

thereby the angular variation becomes substantially "0". Therefore, occurrence of misfire is not detected, thereby preventing the erroneous decision of misfire.

In FIG. 3B, if the misfire actually occurs, the elementary term $(\omega_{n-1}-\omega_n)$ of Equation (5) includes the rotational variation element between cylinders due to the deceleration and rotational variation element due to the misfire. On the other hand, the correction term $\{(\omega_{n-9}-\omega_{n-1})/8\}$ of Equation (5) does not include the rotational variation element due to the misfire. That is, in FIG. 3B, as described in the following Formula (7), $$\omega_{n-1} - \omega_n > \frac{\omega_{n-9} - \omega_{n-1}}{8} \tag{7}$$

the angular speed variation exceeds the reference value K in the routine of FIG. 2. Therefore, by using the above-mentioned equation (4), only the rotational variation due to the misfire can be extracted as Δω, thereby obtaining accurate misfire detection.

In this connection, if the internal combustion engine 1 is in a normal operation (fixed speed traveling), as $\omega_{n-9} \approx \omega_{n-1}$, the correction term $\{(\omega_{n-9}-\omega_{n-1})/8\}$ becomes substantially "0", thereby detecting the occurrence of misfire on the basis of the elementary term $(\omega_{n-1}-\omega_n)$.

On the other hand, as shown in FIG. 4, when continuous misfire occurs in the cylinder 2 (#2), the correction term $(\omega_{n-9}-\omega_{n-1})/8$ corresponds only to the variation of engine rotational speed. Accordingly, the correction term corresponds to the rotational variation element due to the change in the engine rotational speed at the time of vehicle acceleration or deceleration ("0" during the fixed speed traveling). For this reason, the rotational variation element due to misfire is included in the elementary term $(\omega_{n-1}-\omega_n)$ and consistent with the value subtracted by the correction term $\{(\omega_{n-9}-\omega_{n-1})/8\}$ from the elementary term $(\omega_{n-1}-\omega_n)$. Accordingly, Equation (5) can calculate data corresponding to the occurrence of misfire per cylinder. That is, by subtracting the correction term from the elementary term, the rotational variation element in relation to the vehicle speed variation is excluded, and only the rotational variation element due to the misfire is extracted. Therefore, even continuous misfire of the specific cylinder can be detected.

Other than the continuous misfire of the same cylinder, continuous misfires of facing cylinders and continuous misfires of adjacent cylinders, though not explained and not shown in the drawings, can be detected in the same way.

According to the above-mentioned apparatus for detecting misfire, the following outstanding effects can be obtained.

(a) The apparatus for detecting misfire according to the present embodiment can solve conventional problems such as an impracticability of detecting continuous misfires of a specific cylinder (continuous misfires of the same cylinder, continuous misfires of facing cylinders, or the like), thereby accurately detecting any patterns of misfire occurring in the internal combustion engine.

(b) In calculating the rotational variation elementary term in Equation (5), the variation amount of the crank angular speed for two adjacent cylinders is calculated (variation amount=$\omega_{n-1}-\omega_n$). In this case, the rotational variation element between the cylinders due to the misfire can be accurately detected, thereby further improving the reliability of the misfire detection result.

(c) Further, in calculating the rotational variation correction term in Equation (5), variation amount of the crank angular speed is calculated with the same cylinder which is 720° CA away, that is, with the same cylinder with one combustion cycle away (variation amount=$\omega_{n-9}-\omega_{n-1}$). In this case, the crank angular speed data stored in the RAM 9c should be only the number of whole cylinder+1, thereby reducing memory capacity compared with the case of calculating variation amount of the crank angular speed with the same cylinder which is two or more cycles away.

According to the present invention, the following embodiment is practicable other than the above-mentioned first embodiment.

(1) According to the embodiment, an apparatus for detecting misfire is applied to an 8-cylinder internal combustion engine. At this time, in relation to the following basic formula for calculating angular speed variation amount, $$\Delta\omega = (\omega_{n-m} - \omega_n) - \frac{\omega_{n-m-N*s} - \omega_{n-m}}{\left(\frac{N*s}{m}\right)} \quad (8)$$

although the number of the whole cylinders N is to be "8", a rotational variation elementary term m to be "1" and a rotational variation correction s to be "1", each value may be modified to be more specific.

For instance, according to the same 8-cylinder internal combustion engine (N=8), the above-mentioned formula becomes as follows in case of m=1 and s=2.

$$\Delta\omega = (\omega_{n-1} - \omega_n) - \frac{\omega_{n-17} - \omega_{n-1}}{16} \quad (9)$$

In addition, according to the same 8-cylinder internal combustion engine (N=8), the above-mentioned formula becomes as follows in case of m=2 and s=1.

$$\Delta\omega = (\omega_{n-2} - \omega_n) - \frac{\omega_{n-10} - \omega_{n-2}}{4} \quad (9)$$

Not limited to the above-mentioned combination, m and s may be appropriately changed.

Further, for example, according to a 6-cylinder internal combustion engine (N=6) or a 4-cylinder internal combustion engine (N=4), the above-mentioned formula becomes as follows in case of m=1 and s=1.

$$\Delta\omega = (\omega_{n-1} - \omega_n) - \frac{\omega_{n-7} - \omega_{n-1}}{6} \quad (10)$$

$$\Delta\omega = (\omega_{n-1} - \omega_n) - \frac{\omega_{n-5} - \omega_{n-1}}{4} \quad (11)$$

In all cases, as same as the aforementioned embodiment, any misfire patterns occurring in the internal combustion engine 1 can be accurately detected. The point is that the object of the present invention can be satisfied by a structure for detecting occurrence of misfire based on the angular speed variation amount obtained by the above-mentioned basic formula, that is, a structure for detecting occurrence of misfire in the internal combustion engine based on rotational variation elementary term calculated by two different cylinders which are m combustion stroke times away and the rotational variation correction term calculated by the value divided the variation of rotational speed per cylinder in relation to the same cylinder which is s combustion cycle away by value of "the number of whole cylinders * s/m."

(2) The angular speed variation amount is compared with the misfire reference value K. If it is greater than K, a misfire counter for counting the number of misfires is incremented "1" at a time. When the number of firings reaches the predetermined number of firings (500, for example), the misfire counter and the predetermined reference value (100, for example). If the number of counts is over the reference value, the misfire detection flag XMF may be set to "1".

(3) The present invention is structured so that, within at least one combustion cycle, there is little rotational pulsation of the engine during driving at a fixed speed, accelerating and decelerating so that only the rotational variation due to misfiring is extracted. Accordingly, when the rotational pulsation occurs within one combustion cycle during rapid (sudden) acceleration, rapid (sudden) deceleration, transient driving, or the like, a temporary interruption of the described misfire detection processing is desirable. More specifically, when the variation amount of the throttle opening per unit-hour or the variation amount of the intake air amount exceeds the predetermined level, the misfire detection should be suspended.

(4) Although the crank angular speed is used as an rotational speed per cylinder in the present embodiment, the crank angular speed may be changed. For example, a time required between TDC of two series of cylinders or a reciprocal of the time may be used as the rotational speed per cylinder.

(5) On the above-mentioned misfire detection, learning processing may be executed to eliminate the crank angular speed deviation between cylinders generated by the electromagnetic pick-up type rotational angular sensor 5. That is, the rotational angular sensor 5 causes detection errors between cylinders due to the following factors:

manufacturing tolerance of rotor detected portions; and dispersion of air gap between the rotor detected portion an the electromagnetic pick-up.

Accordingly, the crank angular deviation (tolerance) is learning-controlled based on the successively inputted intake pipe pressure PM, the rotational signal NE and the reference position signal CYL. To summarize, among the eight cylinders, the crank angular deviations of the cylinders 2 through 8 (#2 to #8) with respect to the cylinder 1 (#1) are learned. Broadly speaking, the following processes are executed.

(A) Based on the time T90i required for the crankshaft revolution of 90° CA, the crank angular deviation n (n=2 through 8) of the cylinders 2 through 8 (#2 through #8) in regard to the cylinder 1 (#1) is calculated per cylinder by multiplying by a predetermined number based on operational condition of the internal combustion engine 1.

(B) On condition that the internal combustion engine 1 is in a normal ignition mode, the multiplied values of the crank angular deviation $\Delta\theta_n$ by cylinder and by operational condition are averaged. The average value is further parameterized to obtain a learning value $\Delta\theta_{nL}$ in regard to the crank angular deviation.

Next, on calculating the crank angular speed $\omega_n$ of the 8-cylinder internal combustion engine, the crank angular speed $\omega_n$ is calculated by the following formula using the time T90i necessary for the crankshaft revolution of 90° CA and the learning value $\Delta\theta_{nL}$.

$$\omega_n = \frac{KDSOMG - \Delta\theta_{nL}}{T90i} \qquad (12)$$

where $\omega_{nL}$ is successively renewed and the value is registered in the back-up RAM 9*d* by cylinder. Such learning processing further improves the accuracy of the misfire detection.

(6) The above-mentioned embodiment implements a misfire detecting device for a 4-stroke internal combustion engine, but the present invention may be applied to a 2-stroke internal combustion engine. In the 2-stroke engine, 360° CA is regarded as the crank angle necessary for one combustion cycle.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A misfire detecting apparatus for an internal combustion engine, said apparatus comprising:
   means for outputting a rotation signal indicative of an engine output shaft rotation;
   means for calculating rotational speed of said shaft based on said rotation signal in connection with cylinder firings;
   means for calculating an elementary term representing variation in said rotational speed between firings of two selected cylinders separated by a predetermined number of cylinder firings;
   means for calculating a correcting term by dividing a variation in rotational speed of said shaft for cylinder firings separated by a predetermined number of combustion cycles for one of the selected cylinders by an integer multiple of a total number of engine cylinders; and
   misfire detecting means for correcting the elementary term with the correcting term and for detecting a misfire of the internal combustion engine based on the thus corrected elementary term.

2. Apparatus as in claim 1 wherein the elementary term is determined for firings of two successively-firing cylinders.

3. Apparatus as in claim 1 wherein the correcting term is determined by dividing a variation in output shaft rotational speed for cylinder firings separated by one combustion cycle for the one of the selected cylinders by the integer multiple of a total number of engine cylinders.

4. A misfire detecting apparatus for an internal combustion engine, said apparatus comprising:
   a sensor that generates and outputs a rotation signal indicative of an engine output shaft rotation;
   a control unit that receives the rotation signal from the sensor and that calculates rotational speed of said shaft based on the rotation signal in connection with cylinder firings;
   the control unit further being operative to calculate an elementary term for variation in the output shaft rotational speed between two selected cylinder firings, and a correcting term for variations in the output shaft rotational speed due to engine acceleration/deceleration between the two selected cylinder firings; and
   the control unit being operative to correct the elementary term with the correcting term and to detect an engine misfire based on the corrected elementary term.

5. Apparatus as in claim 4 wherein the two cylinder firings are two successive cylinder firings.

6. Apparatus as in claim 4 wherein the correcting term is determined by dividing a variation in output shaft rotational speed for cylinder firings separated by one combustion cycle for a selected cylinder.

7. A controller including means for calculating an engine speed variation elementary term based on sensed engine speed between two selected engine cylinder firings, and an engine speed variation correcting term based on engine speed variations caused by engine acceleration/deceleration between the two selected engine cylinder firings, and means to thereby detect an engine misfire based on the elementary term as adjusted by the correcting term.

8. A controller as in claim 7 wherein the elementary term is based on two successive cylinder firings.

9. A controller as in claim 7 wherein the correcting term is determined by dividing a variation in engine output shaft rotational speed for cylinder firings separated by one combustion cycle for one of the selected cylinder firings.

10. A method of detecting misfire of an internal combustion engine, said method comprising the steps of:
    determining an engine output shaft rotational speed;
    calculating a rotational speed variation elementary term for variation in the output shaft rotational speed between two selected cylinder firings;
    calculating a rotational speed variation correcting term for variation in the output shaft rotational speed due to engine acceleration/deceleration between the two cylinder firings; and
    correcting the rotational speed variation elementary term with the rotational speed variation correcting term to detect whether an engine misfire has occurred based on the corrected elementary term.

11. A controller as in claim 10 wherein the step of calculating an elementary term comprises calculating a rotational speed variation elementary term between two selected successive cylinder firings.

12. A controller as in claim 10 wherein the step of calculating a correcting term comprises dividing variation in engine output shaft rotational speed related to cylinder firings separated by one combustion cycle for one of the selected cylinder firings.

* * * * *